(12) United States Patent
Suzuki

(10) Patent No.: US 8,102,873 B2
(45) Date of Patent: Jan. 24, 2012

(54) COMMUNICATION SYSTEM, COMMUNICATION APPARATUS AND TERMINAL ACCOMMODATION APPARATUS

(75) Inventor: Muneyuki Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 12/555,335

(22) Filed: Sep. 8, 2009

(65) Prior Publication Data

US 2010/0098091 A1   Apr. 22, 2010

(30) Foreign Application Priority Data

Oct. 21, 2008 (JP) ................................. 2008-270935

(51) Int. Cl.
*H04L 12/43* (2006.01)
(52) U.S. Cl. ........................................................ 370/458
(58) Field of Classification Search .................. 370/351, 370/352
See application file for complete search history.

(56) References Cited

U.S. PATENT DOCUMENTS

| | | | | |
|---|---|---|---|---|
| 5,610,910 | A | * 3/1997 | Focsaneanu et al. | 370/351 |
| 6,512,762 | B1 | * 1/2003 | Renucci et al. | 370/352 |
| 2005/0025120 | A1 | * 2/2005 | O'Toole et al. | 370/351 |
| 2005/0175032 | A1 | * 8/2005 | Yeom | 370/466 |
| 2006/0077968 | A1 | * 4/2006 | Pitsoulakis et al. | 370/352 |

FOREIGN PATENT DOCUMENTS

| | | |
|---|---|---|
| EP | 1 681 898 A1 | 7/2006 |
| JP | 9-312666 | 12/1997 |
| JP | 2000-358098 | 12/2000 |
| JP | 2005-94480 | 4/2005 |
| JP | 2006-211033 | 8/2006 |
| JP | 2006-261978 | 9/2006 |
| JP | 2010-124457 | 6/2010 |

OTHER PUBLICATIONS

Office Action issued Dec. 3, 2010 in JP Application No. 2009-204084.
Angela Langowski, "VoDSL", CedMagazine.com, Apr. 1, 2001, 3 pages.

* cited by examiner

*Primary Examiner* — Ayaz Sheikh
*Assistant Examiner* — Blanche Wong
(74) *Attorney, Agent, or Firm* — Oblon, Spivak, McClelland, Maier & Neustadt, L.L.P.

(57) ABSTRACT

A communication system, a communication apparatus and a terminal accommodation apparatus which use a metallic subscriber line and are a high-speed and inexpensive are provided. The communication system includes a plurality of terminal accommodation apparatuses 200 for accommodating terminals 3c, 3d, a communication apparatus 1 connected to an IP network 4, and digital subscriber lines L3 for connecting the plurality of terminal accommodation apparatuses 200 and the communication apparatus 1. The terminal accommodation apparatus 200 includes a PCM (pulse code modulation) modulator and a subscriber line interface. The PCM modulator converts a voice signal received from the terminal 3c to PCM data. The subscriber line interface transmits data including the PCM data to the communication apparatus 1 via the metallic subscriber line L3. The communication apparatus 1 includes an IP converter 130 for converting the PCM data to an IP (Internet protocol) packet.

5 Claims, 10 Drawing Sheets

COMMUNICATION SYSTEM, COMMUNICATION APPARATUS AND TERMINAL ACCOMMODATION APPARATUS

CROSS REFERENCE TO RELATED APPLICATION

This application is based upon and claims the benefit of priority from Japanese Patent Application No. 2008-270935, filed on Oct. 21, 2008, the entire contents of which are incorporated herein by reference.

FIELD OF THE INVENTION

The present invention relates to a communication system in which a terminal accommodated in a terminal accommodation apparatus makes communication using a DSL (digital subscriber line), a communication apparatus, and the terminal accommodation apparatus.

DESCRIPTION OF THE BACKGROUND

A subscriber line which is an information transmission line is widespread in enterprises, stores and houses as an infrastructure for Internet access by advancement of the information communication technology. Conventionally, digital transmission using a metallic subscriber line uses a basic rate interface of the ISDN (integrated services digital network) or an ADSL (asymmetric digital subscriber line). In recent years, an optical subscriber line is widespread and the metallic subscriber line is switched to the optical subscriber line. However, in a region where the optical subscriber line is not widespread, a region where the optical subscriber line is hardly widespread, and collective housing where the optical subscriber line is not introduced, the metallic subscriber line is used as an information transmission line still at present.

The ADSL is widespread as an Internet access means faster than the ISDN. The ADSL is a service using a frequency band having a large transmission loss, so that as a terminal is separated from a central telephone exchange, the deterioration in an electric signal is increased. Therefore, a problem arises that only the terminal located within a distance of 6 to 7 km from the central telephone exchange can enjoy the service. Further, in the ADSL, as indicated by the name, the speed on the upward is asymmetric to the speed on the downward. The main use of the ADSL in each house is to access the website of the Internet, so that the downward with large communication traffic is set at a high speed. Therefore, the ADSL is unsuitable for a means for improving the communication speed of the upward.

This problem of the ADSL can be solved by use of the optical subscriber line. However, a user who cannot use the optical subscriber line makes several contracts of the ISDN line to increase the communication speed of the up line, in the present state.

On the other hand, the ADSL adopts an ATM (asynchronous transfer mode) communication system. The ADSL using the ATM communication system premises the transmission and reception of data converted to an IP (Internet protocol) packet. Thus, it is necessary to convert PCM (pulse code modulation) data of voice etc. to the IP packet. Therefore, a terminal accommodation apparatus for connecting a telephone terminal to the ADSL needs a function (a VoIP processing unit) for converting a voice signal to the IP packet represented by a VoIP (Voice over IP) (refer to Japanese Patent Application disclosure 2006-203876).

However, the VoIP processing unit is comparatively expensive. Therefore, if each terminal accommodation apparatus installs an IP conversion unit, a problem arises that the cost for providing services is increased as a whole communication system.

SUMMARY OF THE INVENTION

The present invention is intended to provide a high-speed and inexpensive communication system using a metallic subscriber line, a communication apparatus, and a terminal accommodation apparatus.

The communication system of the present invention includes a plurality of terminal accommodation apparatuses respectively to accommodate a terminal, a communication apparatus connected to an IP (Internet protocol) network, and a digital subscriber line to connect the terminal accommodation apparatuses and communication apparatus. Each of the terminal accommodation apparatuses has a PCM modulator and demodulator to convert a first voice signal from the communication apparatus to first PCM (pulse code modulation) data and convert second PCM data from the communication apparatus to a second voice signal. The communication apparatus has a plurality of IP conversion units. Each IP conversion unit has a VoIP processing unit to convert the first PCM data received from the terminal accommodation apparatus to a first IP packet and convert a second IP packet received from the IP network to second PCM data.

Further, the communication apparatus according to the present invention includes a first interface configured to connect with a terminal accommodation apparatus to accommodate a terminal via a digital subscriber line, a second interface configured to connect with an IP network, and an IP converter has a VoIP processing unit to convert first PCM data received from the terminal accommodation apparatus to first IP packet data and convert second IP packet data received from the IP network to second PCM data. The first interface receives the first PCM data from the terminal accommodation apparatus using a signal having a first time division frame structure and transmits the second PCM data to the terminal accommodation apparatus using a signal having a second time division frame structure via the digital subscriber line.

Furthermore, a terminal accommodation apparatus according to the present invention is used in a communication system including a terminal accommodation apparatus to accommodate a telephone terminal, a communication apparatus having a VoIP processing unit to convert PCM data to packet data and connected to an IP network, and a digital subscriber line to connect the terminal accommodation apparatus and communication apparatus. The terminal accommodation apparatus includes a telephone interface to receive a voice signal from the telephone terminal, a PCM modulator to convert the received voice signal to PCM data, a multiple unit configured to insert the PCM data into a predetermined time slot of a signal using a time division frame structure, and a subscriber line interface configured to transmit the signal of the time division frame structure to the communication apparatus via the digital subscriber line.

DETAILED DESCRIPTION OF THE INVENTION

Hereinafter, the embodiment of the present invention will be explained with reference to the accompanying drawings.

Figure 1:
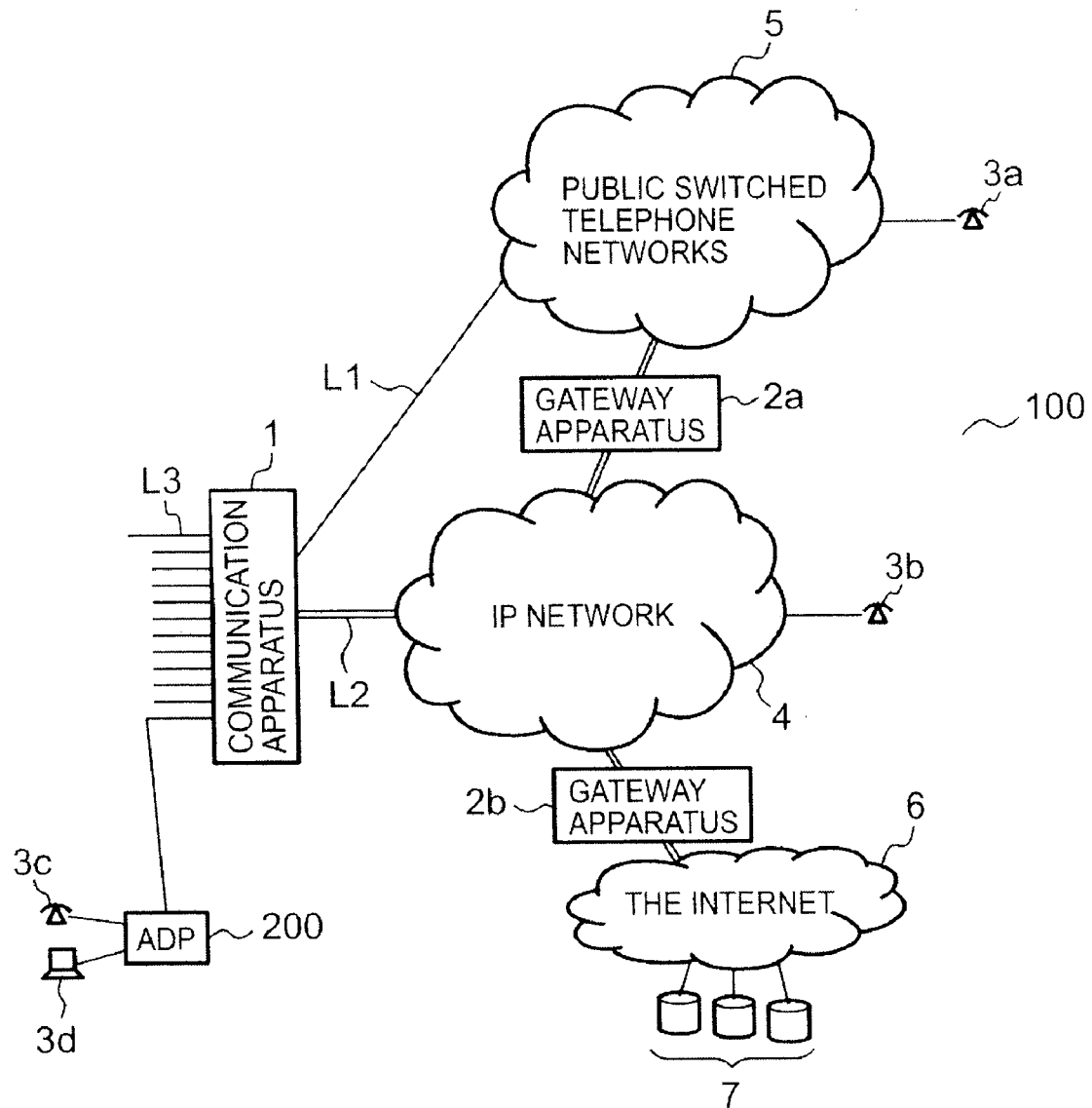
FIG. 1 is a block diagram showing a constitution of a communication system relating an embodiment of the present invention.

FIG. 1 is a block diagram showing the constitution of a communication system 100 of the embodiment. In the communication system 100, a terminal accommodation apparatus 200 is connected to a communication apparatus 1 and the communication apparatus 1 is connected to an IP network 4 and public switched telephone network 5. The IP network 4 and public switched telephone network 5 are connected to each other via a gateway apparatus 2a. Further, the IP network 4 is connected to the Internet 6 via a gateway apparatus 2b and a plurality of server apparatuses 7 are connected to the Internet 6.

A telephone terminal 3c and a data terminal 3d such as a personal computer (PC) are connected to the terminal accommodation apparatus 200. The telephone terminal 3c and the data terminal 3d communicate with the IP network 4 and the public switched telephone network 5 via the terminal accommodation apparatus 200 and the communication apparatus 1. The telephone terminal 3c can communicate with an IP telephone terminal 3b connected to the IP network 4 and a telephone terminal 3a connected to the public switched telephone network 5. Further, the data terminal 3d can connect with the Internet 6.

An xDSL such as an SHDSL (single-pair high-speed digital subscriber line) using a metallic subscriber line L3 is used to connect the communication apparatus 1 and terminal accommodation apparatus 200. The metallic subscriber line L3 is used as a digital subscriber line L3. Many digital subscriber lines L3 are connected to the communication apparatus 1. In FIG. 1, only one terminal accommodation apparatus 200 is shown, though each of the terminal accommodation apparatus 200 is connected to each of the digital subscriber lines L3. The SHDSL is applied to the digital subscriber line L3 for connecting the communication 1 and the terminal accommodation apparatus 200, thus even if the distance between the communication apparatus 1 and the terminal accommodation apparatus 200, that is, the length of the digital subscriber line L3 is long, the Internet access service can be provided at a high speed compared with the case that the ADSL is applied.

Figure 2:
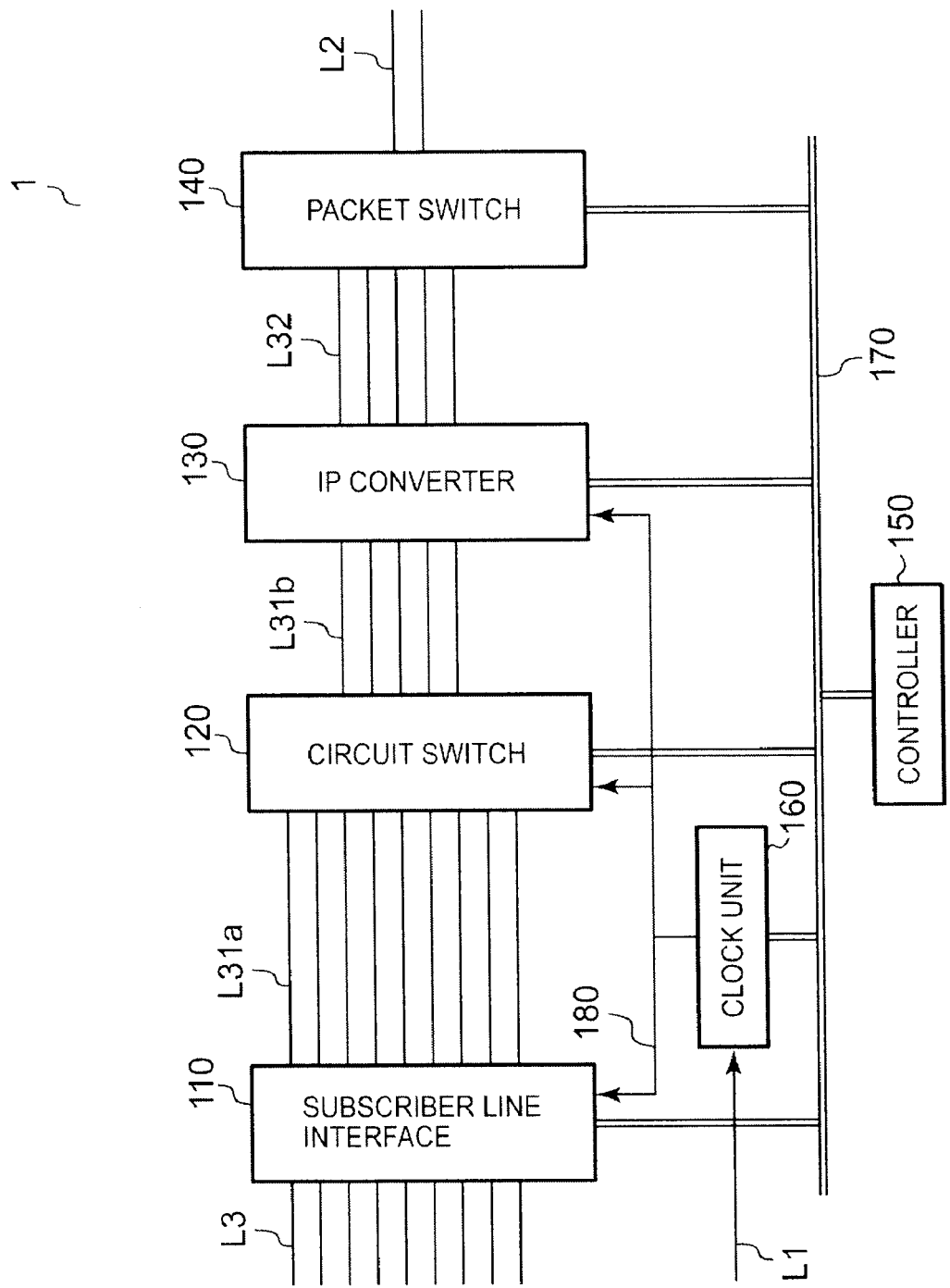
FIG. 2 is a block diagram showing a constitution of a communication apparatus of the communication system relating the embodiment of the present invention.

FIG. 2 is a block diagram showing the constitution of the communication apparatus 1. The communication apparatus 1 includes a subscriber line interface 110, a circuit switch 120, an IP converter 130, a packet switch 140, a controller 150, and a clock unit 160.

The communication apparatus 1 internally includes PCM highways L31a, PCM highways L31b, internal data LANs L32, a control bus 170, and a clock line 180. Further, a line L1, cables L2 and digital subscriber lines L3 are connected to the communication apparatus 1.

The digital subscriber line L3 connects the subscriber line interface 110 and the terminal accommodation apparatus 200. The PCM highway L31a connects the subscriber line interface 110 and the circuit switch 120. The PCM highway L31b connects the circuit switch 120 and the IP converter 130. The internal data LAN L32 connects the IP converter 130 and the packet switch 140. Furthermore, the cable L2 connects the packet switch 140 and the external IP network 4. The line L1 connects the clock unit 160 and the public switched telephone network 5.

The subscriber line interface 110 transmits the data transmitted on the digital subscriber line L3 onto the PCM highway L31a and transmits the data transmitted on the PCM highway L31a onto the digital subscriber line L3. Both the digital subscriber line L3 and PCM highway L31a are time-division buses, however, the numbers of time slots of time divisions are different between them. Therefore, the subscriber line interface 110 interfaces with both time division buses. The subscriber line interface 110, in FIG. 2, is shown as one block, though the subscriber line interface 110 is composed of the same number of subscriber line interface units 110a, - - -, and 110n as the number of the digital subscriber lines L3 accommodated in the communication apparatus 1. One digital subscriber line L3 and one PCM highway L31a are connected to the subscriber line interface unit 110a, and the subscriber line interface 110a processes data stream.

The number of the PCM highways L31b is smaller than the number of the PCM highways L31b and the circuit switch 120 connects the selected PCM highway L31a and the selected PCM highway L31b. By doing this, the circuit switch 120 connects the selected subscriber line interface unit 110 and a selected IP conversion unit of the IP converter 130.

The IP converter 130 converts PCM data sent from the circuit switch 120 to an IP packet or converts IP packet sent from the packet switch 140 to PCM data. The IP converter 130 is shown as one block in FIG. 2, though it is composed of IP conversion units 130a, - - -, and 130n in the same number as the number of the PCM highways L31b, that is, in a smaller number than the number of the digital subscriber lines L3 accommodated in the communication apparatus 1. One PCM highway L31b and one internal data LAN L32 are connected to the IP conversion unit 130, and the IP conversion unit 130a performs IP conversion of data stream.

The packet switch 140 transmits the IP packet transmitted on the internal data LAN L32 to an address of the IP packet using the cable L2 connected to the IP network 4. Further, inversely, it distributes the IP packet inputted externally to the internal data LAN L32.

The subscriber line interface 110, the circuit switch 120, the IP converter 130, the packet switch 140, controller 150, and the clock unit 160 are connected to the control bus 170 and are mutually connected via the control bus 170. The clock unit 160 is connected to the public switched telephone network 5 via the line L1 and receives a clock supplied from the public switched telephone network 5. And, the clock unit 160 supplies the clock to the subscriber line interface 110, the circuit switch 120, and the IP converter 130 via a clock line 180.

Next, by referring to FIGS. 3 to 6, the constitution of the subscriber line interface unit 110a, the circuit switch 120, the controller 150, the IP conversion unit 130a, and the packet switch 140 which are installed in the communication apparatus 1 will be explained.

Figure 3:
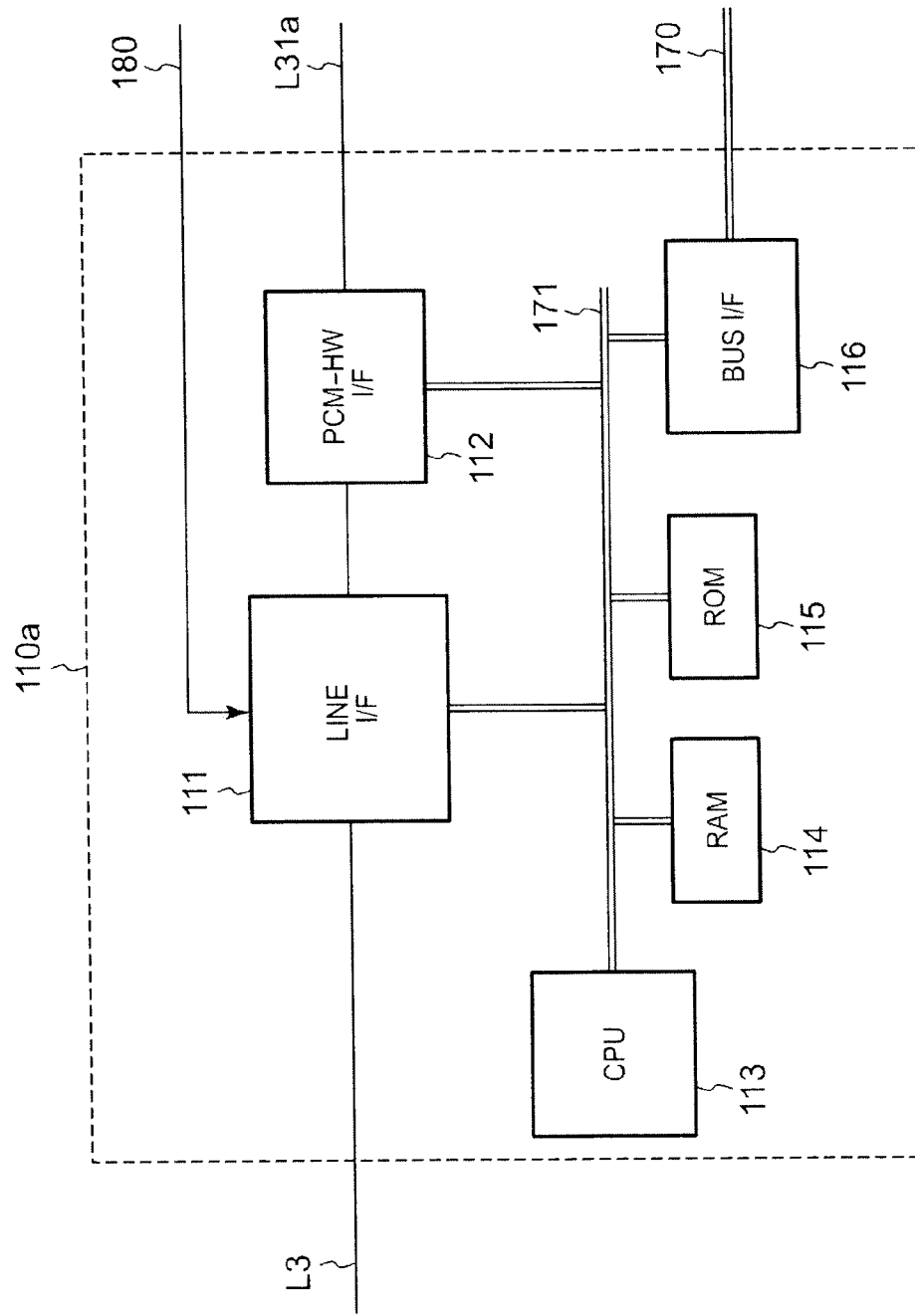
FIG. 3 is a block diagram showing a constitution of a subscriber line interface unit installed in the communication apparatus of the communication system relating the embodiment of the present invention.

Firstly, the subscriber line interface 110a will be explained. FIG. 3 is a block diagram showing the constitution of the subscriber line interface unit 110a which is one of the units which constitute the subscriber line interface 110. The subscriber line interface units 110a to 110n have the same constitution. The subscriber line interface unit 110a includes a line interface 111, a PCM highway interface 112, a CPU 113, a RAM 114, a ROM 115, and a bus interface 116.

One subscriber line L3 among the many digital subscriber lines L3 accommodated in the communication apparatus 1 is connected to the line interface 111 and the clock outputted by the clock unit 160 is inputted to the line interface 111 via the clock line 180. Further, the line interface 111 is connected to the PCM highway interface 112. The PCM highway L31a connected to the circuit switch 120 is connected to the PCM highway interface 112. Further, the CPU 113, the RAM 114, the ROM 115, the bus interface 116, the line interface 111, and the PCM highway interface 112 are connected to a data bus 171 and are mutually connected via the data bus 171. Furthermore, the bus interface 116 is connected to the control bus 170 connected to a bus interface 154 installed in the controller 150 which will be described later.

As mentioned above, the subscriber line interface 110a interfaces with both the time division buses of the digital subscriber line L3 and PCM highway L31a. The line interface 111, on the basis of the clock inputted from the clock unit 160, takes out data from a predetermined time slot of a signal using a time division frame structure of 8 time slots which is sent via the digital subscriber line L3 and sends it to the PCM highway interface 112. The PCM highway interface 112 inserts the received data into a predetermined time slot of a signal using a time division frame structure of 32 time slots on the PCM highway L31a.

Further, inversely, a signal using a time division frame structure of 32 time slots which is sent on the PCM highway L31a is inputted to the PCM highway interface 112. The PCM highway interface 112 takes out the data inserted in a predetermined time slot and sends it to the line interface 111. The line interface 111 inserts the data into a predetermined time slot of a signal using a time division frame structure of 8 time slots and transmits the data to the terminal accommodation apparatus 200 via the digital subscriber line L3. In this way, the subscriber line interface 110 interfaces with the digital subscriber line L3 and PCM highway L31a.

Figure 4:
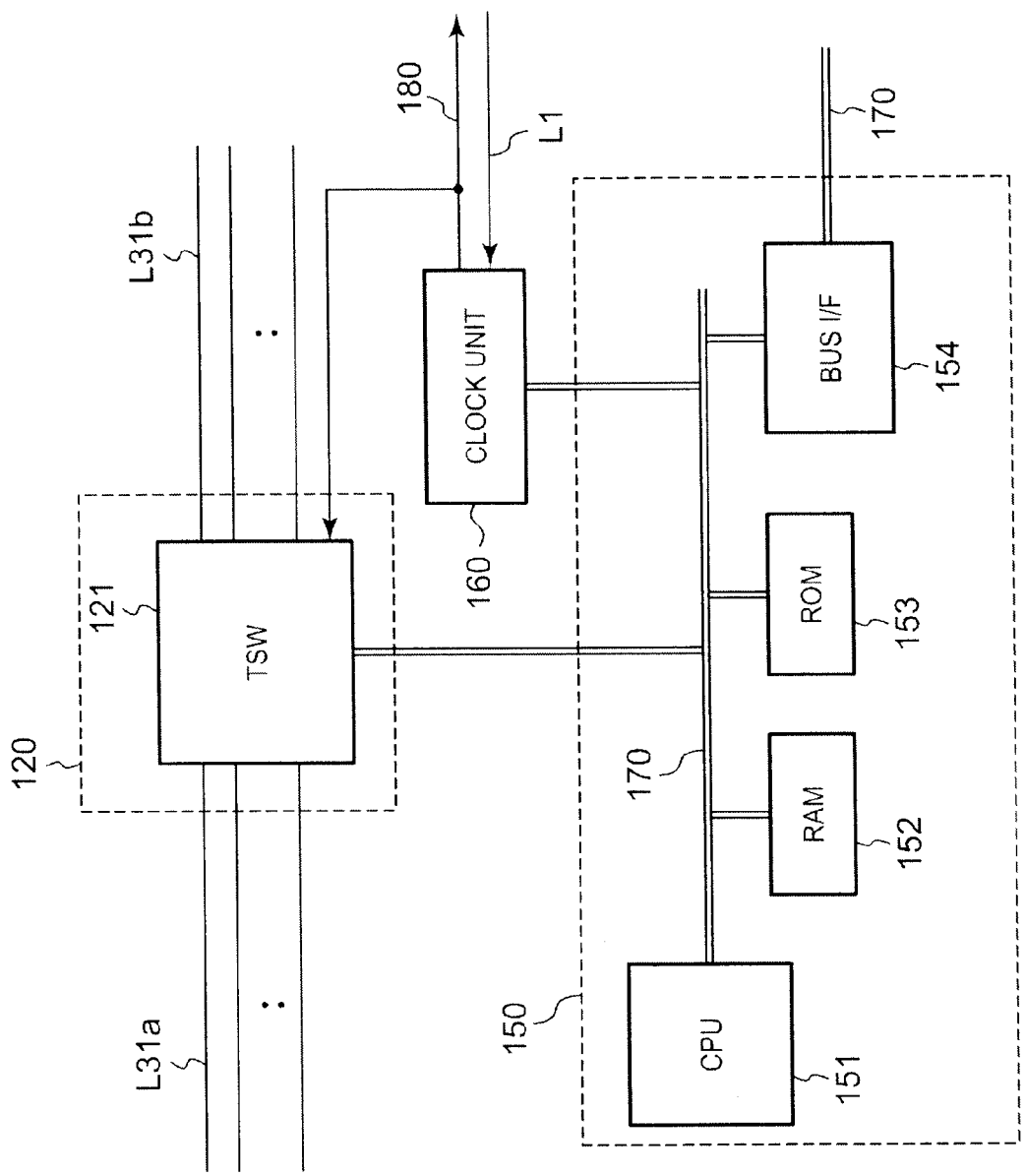
FIG. 4 is a block diagram showing a constitution of a circuit switch and a controller installed in the communication apparatus of the communication system relating the embodiment of the present invention.

Next, the circuit switch 120 and controller 150 will be explained. FIG. 4 is a block diagram showing the constitution of the circuit switch 120 and controller 150.

The circuit switch 120 has a time division switch 121. The time division switch 121 is connected to the PCM highway L31a and the PCM highway L31b.

The time division switch 121 is configured to connect the plurality of PCM highways L31a connected to the subscriber line interface 110 and the plurality of PCM highways L31b connected to the IP converter 130 on the basis of the clock supplied from the clock unit 160 via the clock line 180 in the time division switch 121. By doing this, a communication line is formed between the PCM highway L31a and the PCM highway L31b.

The controller 150 includes a CPU 151, a RAM 152, a ROM 153, and the bus interface 154. The CPU 151, the RAM 152, the ROM 153, the bus interface 154, the time division switch 121, and the clock unit 160 are connected to the control bus 170 and are mutually connected by the control bus 170. Further, the control bus 170 are connected to the subscriber line interface 110, IP converter 130 and the packet switch 140 via the bus interface 154. Further, the circuit switch 120 and the clock unit 160 are formed on the same circuit board as that of the controller 150, so that the circuit switch 120 and the clock unit 160 are directly connected to the control bus 170 not via the bus interface 154.

Figure 5:
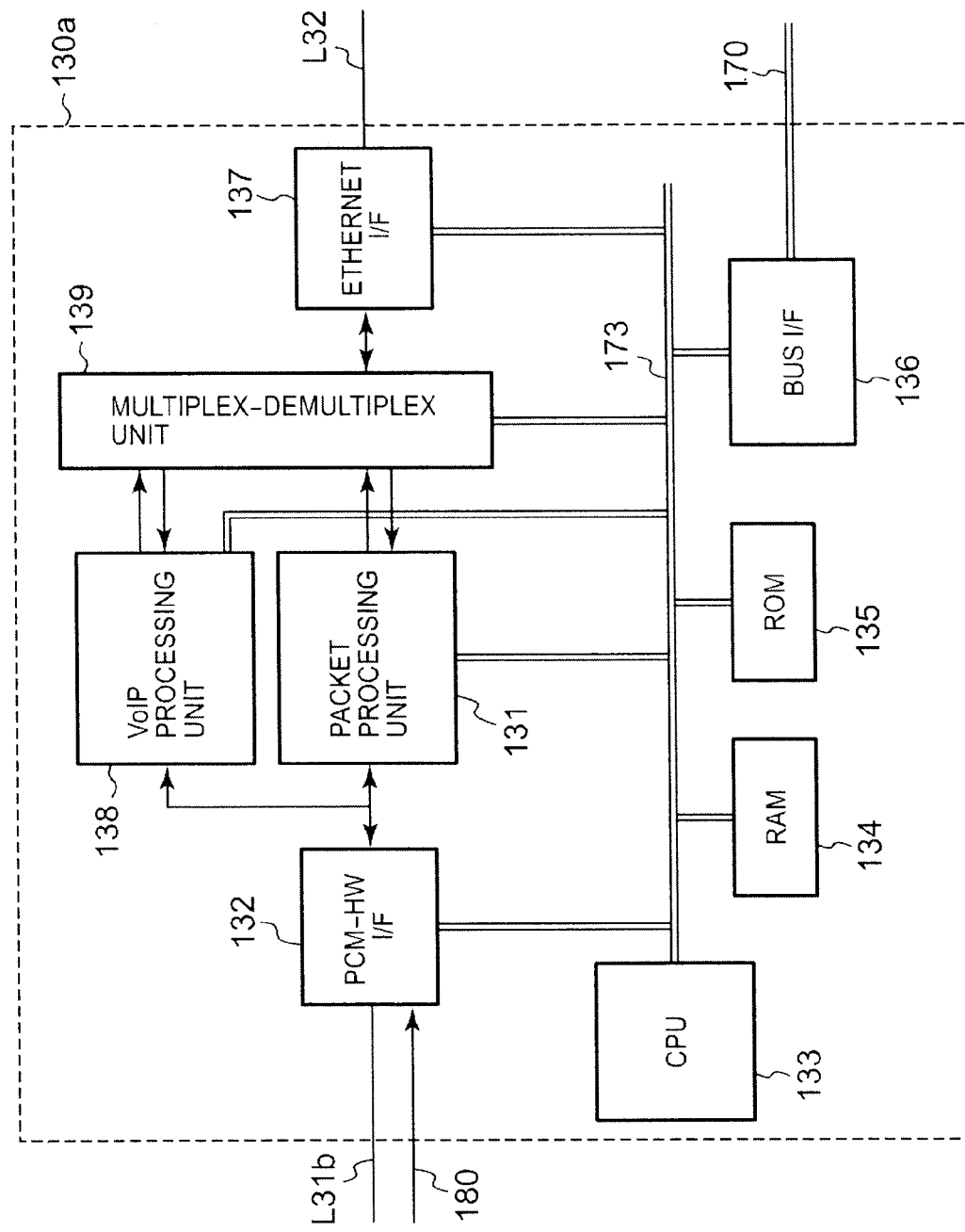
FIG. 5 is a block diagram showing a constitution of an IP conversion unit installed in the communication apparatus of the communication system relating the embodiment of the present invention.

Next, the IP converter 130 will be explained. FIG. 5 is a block diagram showing the constitution of the IP conversion unit 130a which is one of the units composing the IP converter 130. The IP conversion units 130a to 130n have the same constitution.

The IP conversion unit 130a includes a PCM highway interface 132, a VoIP processing unit 138, a packet processing unit 131, a multiplex-demultiplex unit 139, an Ethernet (registered trademark) interface 137, a CPU 133, a RAM 134, a ROM 135 and a bus interface 136.

Among the PCM highways L31b connected to the circuit switch 120, one PCM highway L31b is connected to the PCM highway interface 132 and the clock is inputted to the PCM highway interface 132 from the clock unit 160 via the clock line 180. Further, the PCM highway interface 132 is connected to the VoIP processing unit 138 and the packet processing unit 131. The VoIP processing unit 138 and the packet processing unit 131 are respectively connected to the multiplex-demultiplex unit 139. Further, the multiplex-demultiplex unit 139 is connected to the Ethernet interface 137.

The CPU 133, the RAM 134, the ROM 135, the bus interface 136, the PCM highway interface 132, the packet processing unit 131, the VoIP processing unit 138, the multiplex-demultiplex unit 139, and the Ethernet interface 137 are connected to an internal control bus 173. Furthermore, the bus interface 136 is connected to the control bus 170 which is connected to the bus interface 154 installed in the control unit 150.

As mentioned above, the IP converter 130 converts the PCM data sent from the circuit switch 120 to the IP packet and converts the IP packet sent from the packet switch 140 to the PCM data.

The PCM highway interface 132 takes out the sent data from the signal using the time division frame structure on the PCM highway L31b sent from the circuit switch 120, on the basis of the clock inputted via the clock line 180. The PCM highway interface 132, among the taken-out data, sends the voice data to the VoIP processing unit 138 and sends the IP packet data to the packet processing unit 131. Digital data such as telephone number and control data is inputted to the packet processing unit 131 via the subscriber line interface 110 and the control bus 170. The packet processing unit 131 converts the digital data to the IP packet with an address, sends it to the multiplex-demultiplex unit 139, and sends the inputted IP packet data as is to the multiplex-demultiplex unit 139. The VoIP processing unit 138 converts the voice data (PCM data) to the IP packet with an address and sends it to the multiplex-demultiplex unit 139. The multiplex-demultiplex unit 139 multiplexes the IP packets received from the packet processing unit 131 and VoIP processing unit 138 and sends it to the Ethernet interface 137 using mechanism of the LAN. Further, the Ethernet interface 137 sends the multiplexed IP packets to the packet switch 140 via the internal data LAN L32.

Further, inversely, the IP packet inputted to the Ethernet interface 137 via the internal data LAN L32 is separated to an IP packet of voice data or an IP packet of data by the multiplex-demultiplex unit 139. The IP packet of voice data is inputted to the VoIP processing unit 138, is converted to the voice data (PCM data), and the voice data is inputted to the PCM highway interface 132. Further, the IP packet of data is converted to the data by the packet processing unit 131 or is outputted as an IP packet as is and is inputted to the PCM highway interface 132. The data inputted to the PCM highway interface 132 is inserted into the predetermined time slot of the signal using the time division frame structure of 32 time slots and is outputted to the PCM highway L31b.

Figure 6:
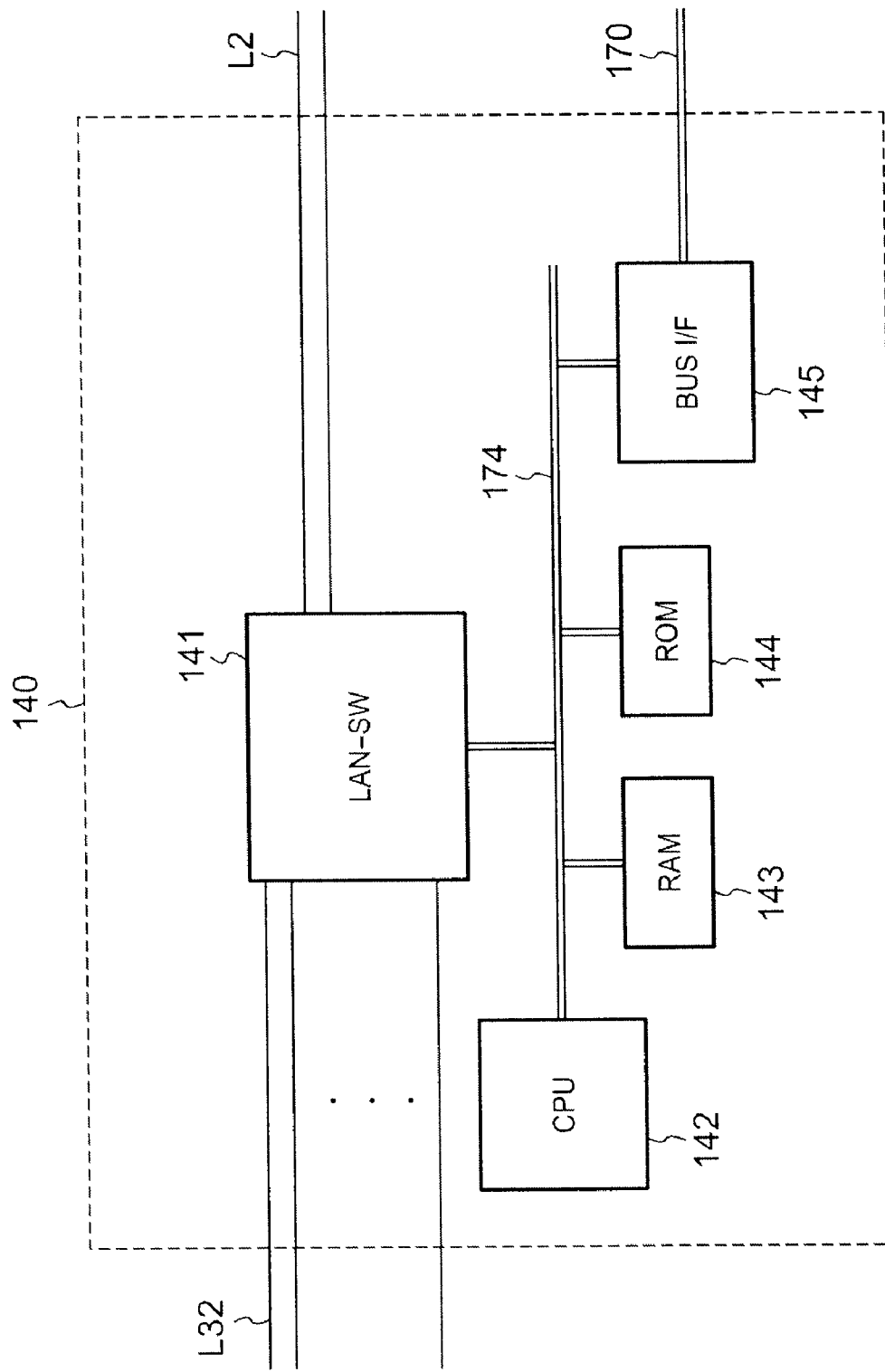
FIG. 6 is a block diagram showing a constitution of a packet switch installed in the communication apparatus of the communication system relating the embodiment of the present invention.

Next, the packet switch 140 will be explained. FIG. 6 is a block diagram showing the constitution of the packet switch 140.

The packet switch 140 includes a LAN switch 141, a CPU 142, a RAM 143, a ROM 144, and a bus interface 145. These units are connected to an internal control bus 174. The many internal data LANs L32 connected to the IP conversion units 130a to 130n and the cables L2 connected to the IP network 4 are connected to the LAN switch 141.

The packet switch 140 connects selectively the cable L2 and the internal data LAN L32 by the LAN switch 141. By doing this, the IP packet transmitted on the internal data LAN L32 is transmitted to the address of the IP packet using the cable L2 connected to the IP network 4 in the exterior of the communication apparatus 1. Further, inversely, the IP packet received via the cable L2 is distributed to the internal data LAN L32 by the LAN switch 141.

The communication apparatus 1 is configured as mentioned above. In the communication apparatus 1, all the PCM data sent from the many terminal accommodation apparatuses 200 accommodated are collected to the IP converter 130 and the IP converter 130 converts all the PCM data to the IP packets. Further, among the IP packets inputted via the IP network 4 and cables L2, the IP packets of voice data are collected to the IP converter 130 and the IP converter 130 converts them to the PCM data. Therefore, compared with a communication system having the VoIP processing unit 138 installed in each of the terminal accommodation apparatus 200, as a whole system, the number of the VoIP processing units 138 for performing the conversion process of the PCM data to the IP packet and conversion process of the IP packet to the PCM data can be reduced. Further, in the system in which each of the terminal accommodation apparatus 200 has the VoIP processing unit 138, the rate of time of nonuse of the VoIP processing unit 138 of each of the terminal accommodation apparatus 200 is high. However, the VoIP processing units 138 are collectively installed in the communication apparatus 1, thus the use efficiency of the VoIP processing unit 138 can be enhanced.

Figure 7:
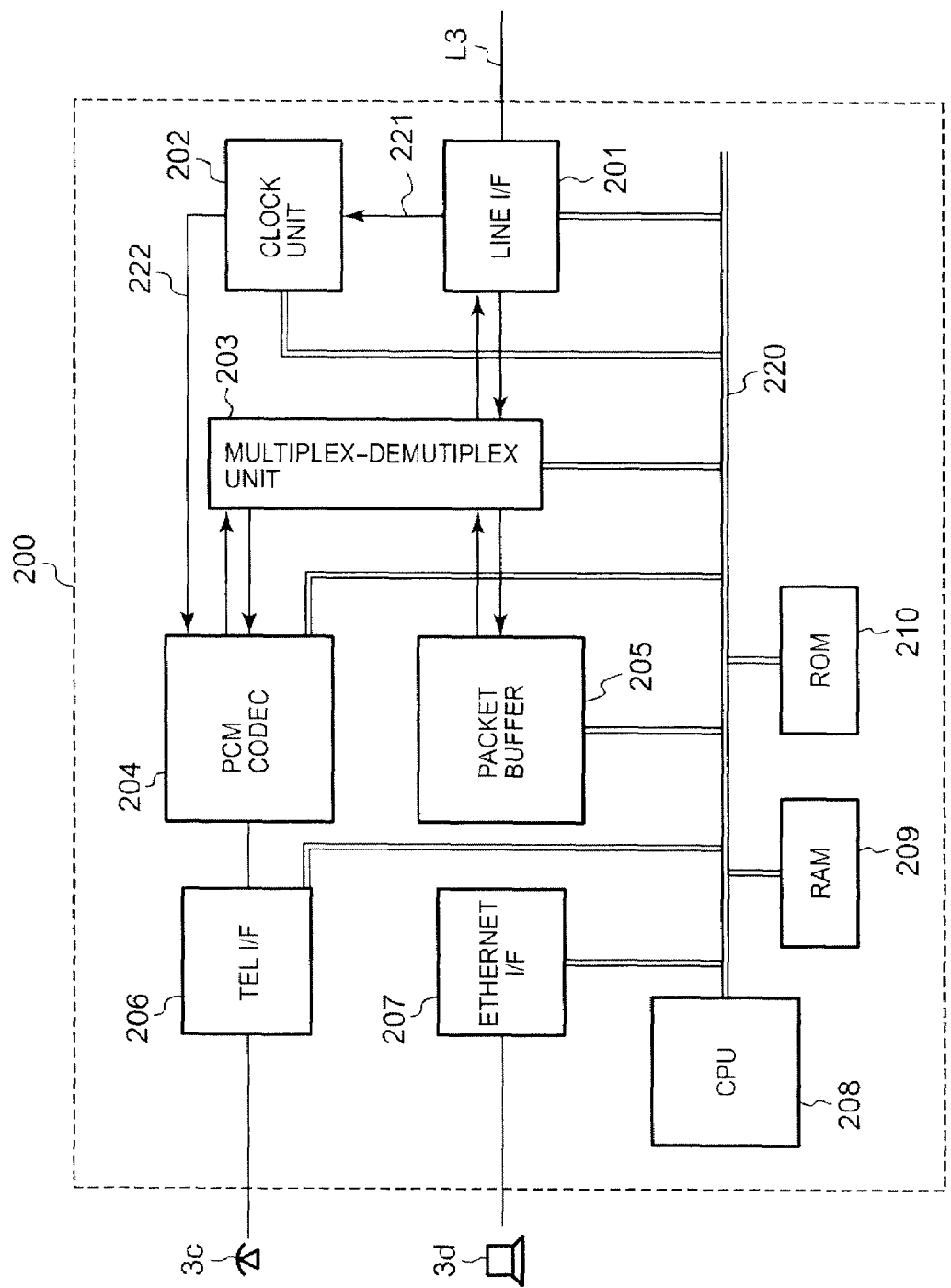
FIG. 7 is a block diagram showing a constitution of a terminal accommodation apparatus installed in the communication system relating the embodiment of the present invention.

Next, the terminal accommodation apparatus 200 will be explained. FIG. 7 is a block diagram showing the constitution of the terminal accommodation apparatus 200.

The terminal accommodation apparatus 200 includes a line interface 201, a clock unit 202, a multiplex-demultiplex unit 203, a PCM modulator and demodulator 204 (it is indicated as a codec in FIG. 7), a packet buffer 205, a telephone interface 206, an Ethernet interface 207, a CPU 208, a RAM 209, and a ROM 210. These units are connected to an internal control bus 220 and are mutually connected via the internal control bus 220.

Firstly, in relation to upward telephone call and communication, the terminal accommodation apparatus 200 will be explained. The telephone terminal 3c is connected to the telephone interface 206. If voice data is inputted from the telephone terminal 3c, the telephone interface 206 sends the voice data to the PCM modulator and demodulator 204. The PCM modulator and demodulator 204, on the basis of a clock inputted from the clock unit 202 via a clock line 222, modulates the voice data to PCM data and sends the PCM data to the multiplex-demultiplex unit 203. Further, the line interface 201 is configured to extract a bit time component from the signal inputted from the digital subscriber line L3 and output it as a clock to the clock unit 202 via a clock line 221. The clock unit 202 will be described later in detail.

The data terminal 3d is connected to the Ethernet interface 207. If IP packet data is inputted from the data terminal 3d, the Ethernet interface 207 sends the IP packet data to the CPU 208 via the internal control bus 220. The CPU 208 sends the IP packet data to the packet buffer 205 via the internal control bus 220. The packet buffer 205, upon receipt of the IP packet data, sends the IP packet data to the multiplex-demultiplex unit 203.

The multiplex-demultiplex unit 203 inserts and multiplexes the PCM data and the IP packet data in the respective predetermined time slots of the signal using the time division frame structure of 8 time slots and sends the multiplexed data to the line interface 201. The line interface 201 transmits the multiplexed data to the communication apparatus 1 via the digital subscriber line L3 which is the time division bus.

As mentioned above, the terminal accommodation apparatus 200, without converting the voice data to an IP packet, multiplexes the PCM data and the IP packet data and transmits them to the communication apparatus 1 via the digital subscriber line L3.

Next, in relation to downward telephone call and communication, the terminal accommodation apparatus 200 will be explained. The case that the signal using the time division frame structure into which the IP packet data and PCM data are inserted is received from the communication apparatus 1 via the digital subscriber line L3 will be explained. If the data that the IP packet data and the PCM data are multiplexed is inputted to the line interface 201, the multiplex-demultiplex unit 203 separates the IP packet data and the PCM data from the predetermined time slots. The separated IP packet data is sent to the packet buffer 205. The IP packet data is read from the packet buffer 205 by the CPU 208 and is sent to the Ethernet interface 207 via the internal bus 220. Further, the Ethernet interface 207 transmits the IP packet data to the data terminal 3d. By doing this, the data terminal 3d can view the Internet website, for example. Further, the multiplex-demultiplex unit 203 transmits the PCM data to the PCM modulator and demodulator 204. The PCM modulator and demodulator 204 converts the PCM data to a voice signal and outputs the voice signal to the telephone interface 206. The telephone interface 206 transmits the voice signal to the telephone terminal 3c.

As mentioned above, the upward and downward telephone call and communication are executed and the telephone call using the telephone terminal 3c and the communication using the data terminal 3d are realized.

Figure 8:
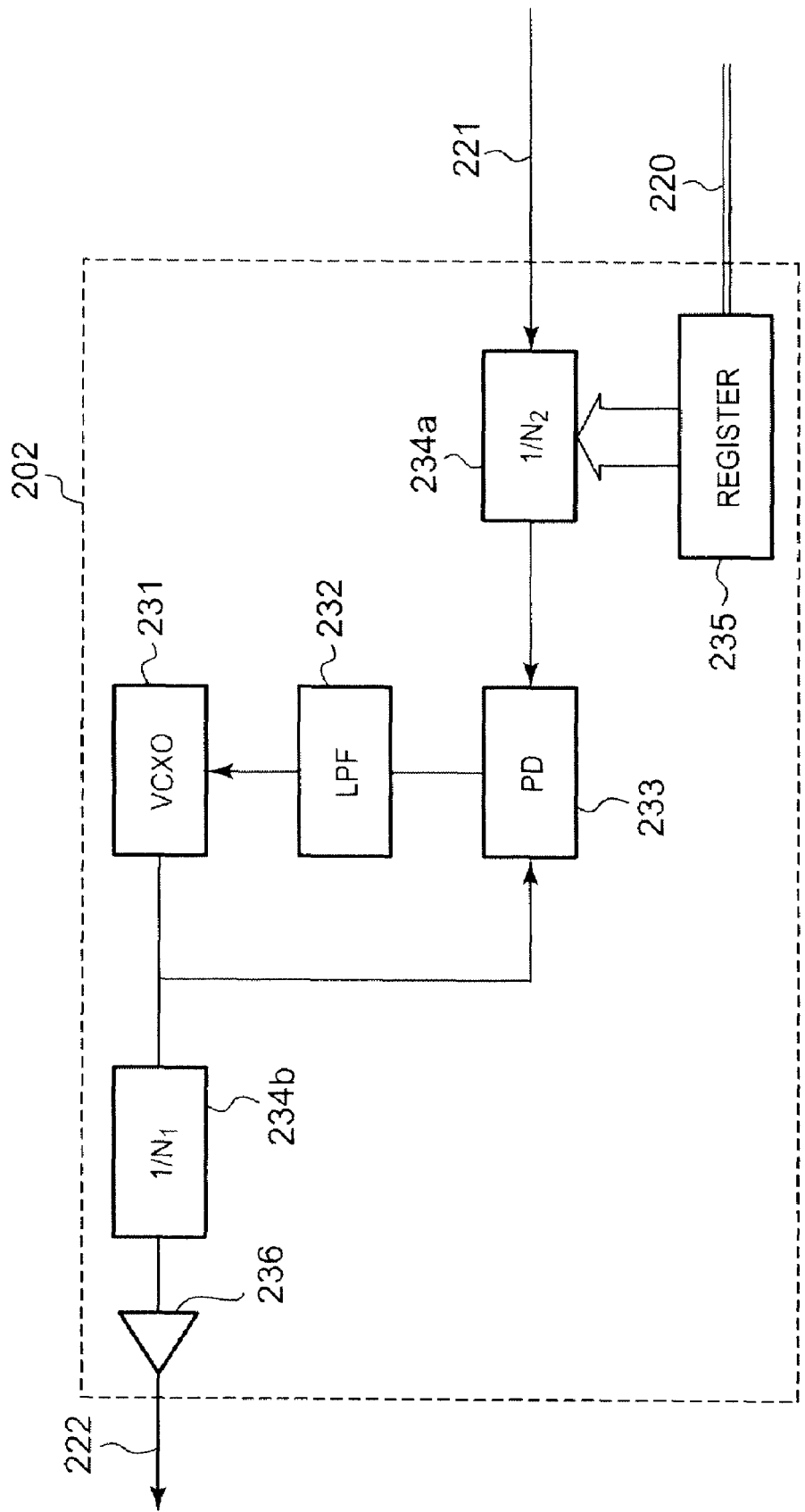
FIG. 8 is a block diagram showing a constitution of a clock unit installed in the terminal accommodation apparatus of the communication system relating the embodiment of the present invention.

FIG. 8 is a block diagram showing the constitution of the clock unit 202 installed in the terminal accommodation apparatus 200. The clock unit 202 generates the clock by a PLL (phase-locked loop) frequency synthesizer and outputs the clock via the clock line 222. The clock unit 202 includes a voltage controlled oscillator 231, a low-pass filter 232, a phase detector 233, frequency dividers 234a and 234b, and a register 235.

The clock sent from the communication apparatus 1 is inputted to the frequency divider 234a via the line interface 201 and clock line 221. The frequency divider 234a divides the frequency of the clock to $1/N_2$. The phase detector 233 outputs a voltage in accordance with the phase difference between a signal outputted from the frequency divider 234a and a signal outputted from the voltage controlled oscillator 231. The low-pass filter 232 removes the high frequency component from the voltage and corrects the phase. The output voltage from the low-pass filter 232 is inputted to the voltage controlled oscillator 231 and the voltage controlled oscillator 231 oscillates a signal of the frequency in accordance with the output voltage. The frequency of the clock outputted by the voltage controlled oscillator 231 is sent to the PCM modulator and demodulator 204 via the frequency divider 234b (frequency dividing ratio $N_1$) and the buffer 236. Here, the frequency dividers 234a and 234b can decide arbitrarily the dividing numbers of the frequency (the number of divisions) $N_1$ and $N_2$. The number of divisions $N_2$ of the frequency divider 234a is decided by the CPU 208 and is set in the register 235 of the clock unit 202 via the internal control bus 220. Further, the number of divisions of the frequency divider 234b is fixed to $N_1$ which is predetermined. The numbers of divisions $N_1$ and $N_2$ of the frequency dividers 234a and 234b are calculated from the frequency of the inputted clock and the frequency of the clock required. For example, when requiring the clock of 64 KHz, so as to obtain a frequency of 64 KHz after division, the number of divisions N ($=N_1 \times N_2$) is calculated and set beforehand.

As mentioned above, if the numbers of divisions $N_1$ and $N_2$ of the frequency dividers 234a and 234b are set, the terminal accommodation apparatus 200 can obtain a clock signal of a predetermined frequency from the clock extracted from the bit timing component of the signal inputted from the digital subscriber line L3.

Next, the data structure used in the communication system 100 will be explained with referring to FIGS. 9 and 10.

Figure 9:
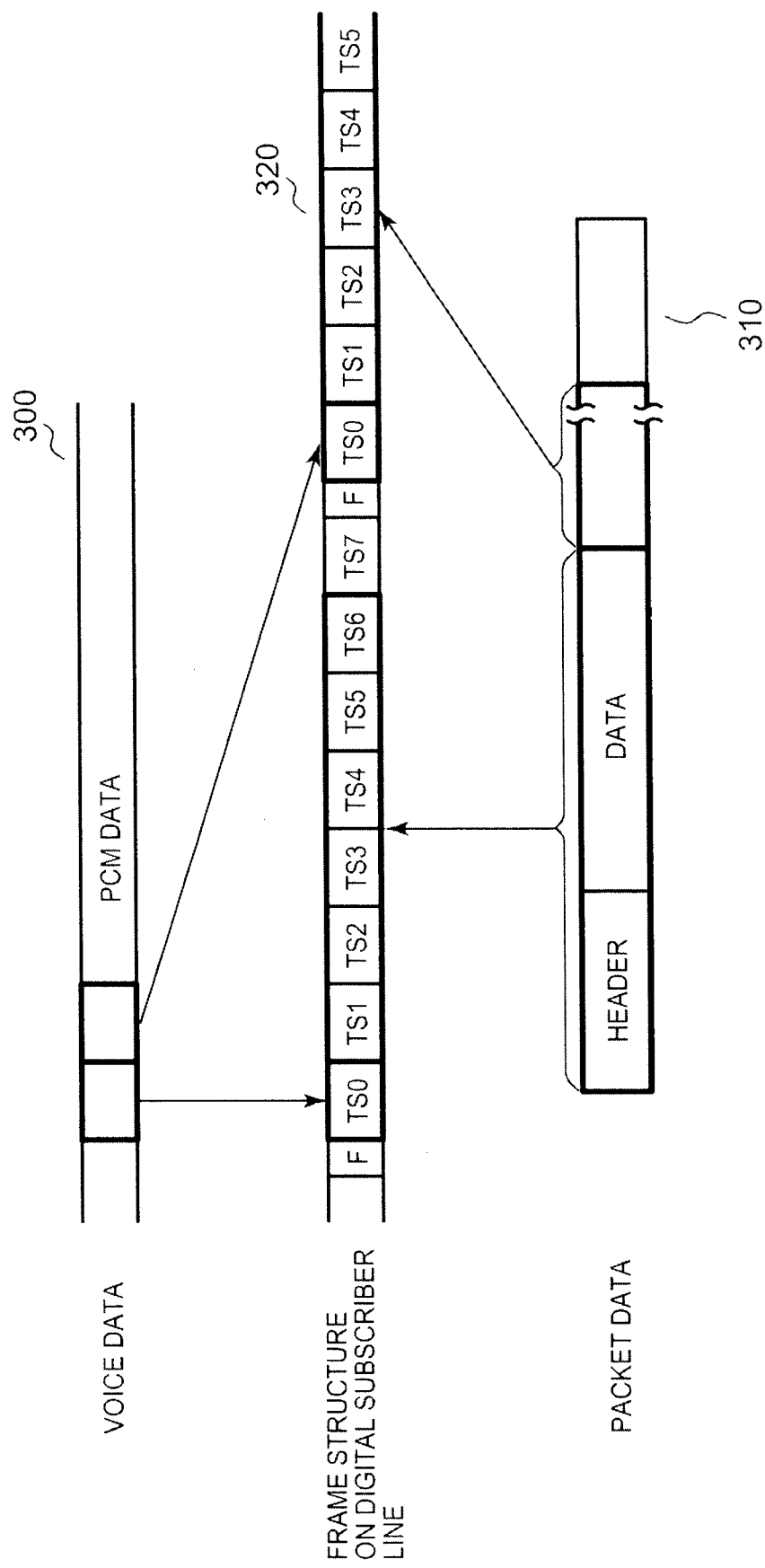
FIG. 9 shows data structure of data transmitted on the digital subscriber line of the communication system relating the embodiment of the present invention.

Firstly, FIG. 9 shows the data structure of the time division frame signal transmitted on the digital subscriber line L3. An example that the PCM data of the voice signal from the terminal 3c and the IP packet data from the terminal 3d are transmitted to the communication apparatus 1 from the terminal accommodation apparatus 200 will be explained. A numeral 300 indicates the voice data (the PCM data) in which the voice signal is modulated by the PCM modulator and demodulator 204. A numeral 310 indicates the IP packet data sent from the packet buffer 205 to the multiplex-demultiplex unit 203. The multiplex-demultiplex unit 203 receiving the PCM data and the IP package data multiplexes the PCM data and the IP packet data in accordance with a time division frame structure 320 on the digital subscriber line L3. The time division frame structure 320 is composed of 8 time slots TS0 to TS7 and a frame synchronization bit F indicating the top of the time division frame. For example, the PCM data uses the time slot TS0 and the IP packet data uses the time slots TS1 to TS6. The multiplex-demultiplex unit 203 divides the PCM data and the IP packet data in the data size capable of transmitting the data using the respective time slots. The multiplex-demultiplex unit 203 inserts the divided PCM data and IP packet data into the respective time slots, thereby multiplexes the PCM data and the packet data. The signal using the time division frame structure 320 into which the PCM data and the IP packet data are inserted is transmitted from the line interface 201 to the communication apparatus 1 via the digital subscriber line L3.

The signal transmitted on the digital subscriber line L3 and inputted to the terminal accommodation apparatus 200 from the communication apparatus 1 has the same frame structure as that of the time division frame structure 320 shown in FIG. 9. In the signal inputted to the terminal accommodation apparatus 200, the data of the time slot TS0 is separated as the PCM data and the data of the time slots TS1 to TS6 is separated as the IP packet data by the multiplex-demultiplex unit 203. Further, the PCM data is converted to the voice signal by the PCM modulator and demodulator 204.

Figure 10:
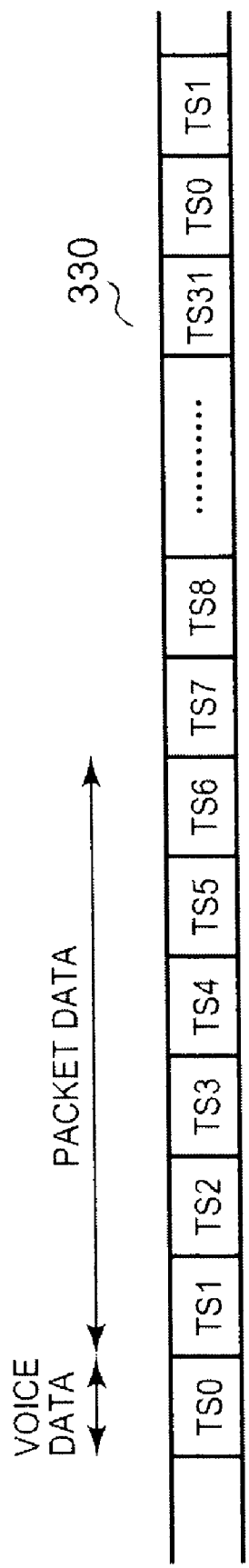
FIG. 10 shows data structure of data transmitted on a PCM highway installed in the communication apparatus of the communication system relating the embodiment of the present invention.

Next, FIG. 10 shows the time division frame structure of a signal transmitted on the PCM highways L31a and L31b installed in the communication apparatus 1. The time division frame structure 320 of the signal received by the subscriber line interface 110 of the communication apparatus 1 via the digital subscriber line L3 is converted to a frame structure 330 shown in FIG. 10, which is transmitted on the PCM highways L31a and L31b, by the subscriber line interface 110. Further, the signal inputted from the IP network 4 is converted to the time division frame structure 330 shown in FIG. 10, which is transmitted on the PCM highways L31a and L31b, by the IP converter 130. The frame structure is composed of 32 time slots TS0 to TS31.

The line interface 111 takes out the data transmitted using the time division frame structure 320 shown in FIG. 9 on the basis of the clock sent from the clock unit 160 and sends it to the PCM highway interface 112. The PCM highway interface 112 transmits the data, which is sent from the line interface 111, on the PCM highway L31a using the time division frame structure 330. The time division frame structure 330, as shown in FIG. 10, for example, uses the time slot TS0 exclusively for the voice data and uses the time slots TS1 to TS6 exclusively for the packet data.

Next, an example that the time division frame structures shown in FIGS. 9 and 10 are used will be indicated.

Firstly, the case that the telephone terminal 3c calls the IP telephone terminal 3b connected to the IP network 4 will be explained. When the telephone terminal 3c performs a dialing operation of calling the IP telephone terminal 3b, the telephone interface 206 of the terminal accommodation apparatus 200 converts the signal of calling and a telephone number of called partner, for example, to an LAPD (link access procedure on the D-channel) protocol and outputs an LAPD protocol signal. The signal based on the LAPD protocol is sent to the multiplex-demultiplex unit 203 via the CPU 208 and the internal bus 220. The multiplex-demultiplex unit 203 inserts the LAPD protocol signal into the time slot TS7 on the digital subscriber line L3 and outputs it to the digital subscriber line L3 via the line interface 221. In the data structure 310 shown in FIG. 9, the time slot TS7 is used for signaling.

On the other hand, in the communication apparatus 1, when the subscriber line interface 110 receives the LAPD protocol signal, the line interface 111 extracts the calling signal on the time slot TS7. The calling signal relays the CPU 113 and is transferred to the control unit 150 via the data bus 171, the bus interface 116 and the control bus 170. In the control unit 150, the CPU 151 communicates with a data base of telephone subscribers not shown in this embodiment and the data base rings the ring tone of the IP telephone terminal 3b. When the IP telephone terminal 3b of the called partner performs an incoming operation such as lifting a receiver, a telephone speech channel is formed between the telephone terminal 3c and the IP telephone terminal 3b.

Next, the case that the telephone terminal 3c and the IP telephone terminal 3b speak by telephone will be explained. Voice inputted to a microphone of the telephone terminal 3c which is not shown is converted to the voice signal. The voice signal is inputted to the terminal accommodation apparatus 200 and is inputted to the PCM modulator and demodulator 204 via the telephone interface 206. The PCM modulator and demodulator 204 converts the inputted voice signal to the PCM data 300 as shown in FIG. 9 and transmits the converted PCM data to the multiplex-demultiplex unit 203. The multiplex-demultiplex unit 203 divides the PCM data into the transmission data size (for example, 8 bits), inserts it into the time slot TS0 of the data structure 320 on the digital subscriber line L3 shown in FIG. 9, and outputs it to the line interface 201. By doing this, the line interface 201 transmits the PCM data using the time division frame structure 320 on the digital subscriber line L3 shown in FIG. 9 to the communication apparatus 1.

On the other hand, in the communication apparatus 1, the line interface 111 extracts the PCM data from the time slot TS0 of the time division frame signal 320 and sends the PCM data to the PCM highway interface 112. The PCM highway interface 112 inserts the extracted PCM data into the time slot TS0 of the time division frame signal 330 on the PCM highway L31a. Hereafter, by the same process as the description shown in FIGS. 4 to 7, the PCM data corresponding to the voice inputted to the telephone terminal 3c is converted to the IP packet and is transmitted to the IP telephone terminal 3b which is a telephone called partner. Further, inversely, the voice inputted to the IP telephone terminal 3b reaches the telephone terminal 3c and speaking by telephone is performed.

Next, the case that the data terminal 3d communicates with the Internet 6 will be explained. Firstly, when the communication terminal 3d is in full-time connection to the Internet 6, the data terminal 3d is connected to the Ethernet interface 207 of the terminal accommodation apparatus 200. The Ethernet interface 207 receiving the IP packet data from the data terminal 3d transmits the IP packet data to the packet buffer 205 via the CPU 208. The packet buffer 205 inputs the IP packet data to the multiplex-demultiplex unit 203. When the data terminal 3d executes the communication, the multiplex-demultiplex unit 203 inserts the IP packet data into the time slots TS1 to TS6 of the time division frame 320 on the digital subscriber line L3 shown in FIG. 9 and sends the time division frame signal 320 to the line interface 201. The line interface 201 transmits the IP packet data using the time division frame structure 320 on the digital subscriber line L3 to the communication apparatus 1.

On the other hand, in the communication apparatus 1, the line interface 111 extracts the IP packet data from the time slots TS1 to TS6 of the time division frame structure 320 on the digital subscriber line L3 and transmits a signal to the PCM highway interface 112. The PCM highway interface 112 inserts the extracted IP packet data into the time slots TS1 to TS6 of the time division frame structure 330 on the PCM highway L31a shown in FIG. 10. Hereafter, by the same process as the description shown in FIGS. 4 to 7, the IP packet data inputted to the data terminal 3d can be transmitted to the Internet 6. Further, inversely, the IP packet sent from the Internet 6 is inputted to the communication terminal. By doing this, the data terminal 3d can view the website of the Internet 6.

As mentioned above, according to the communication system of this embodiment, the VoIP processing unit 138 for converting the PCM data to the IP packet is collected to the communication apparatus 1. Further, all the PCM data sent from the many terminal accommodation apparatuses accommodated in the communication apparatus 1 is converted to the IP packet by the VoIP processing unit 138 installed in the IP converter 130. Therefore, as a whole system, the number of VoIP processing units 138 to perform a process for converting the IP packet can be reduced and the cost can be decreased.

Further, when each of the many terminal accommodation apparatuses 200 has the VoIP processing unit 138, the rate of the time that the VoIP processing unit 138 is not used is high in each of the terminal accommodation apparatuses 200. However, the VoIP processing units 138 are collected and installed in the communication apparatus 1, thus the use efficiency of the VoIP processing units 138 is increased.

As mentioned above, according to the present invention, as a whole system, the communication system capable of reducing the number of IP conversion units 130 and lowering the cost can be obtained. Further, according to the present invention, as a whole system, a communication apparatus 1 at a decreased cost can be obtained. Furthermore, according to the present invention, the terminal accommodation apparatus 200 does not include the VoIP processing unit 138, so that the terminal accommodation apparatus 200 can be obtained at a decreased cost.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A communication system comprising:
    a plurality of terminal accommodation apparatuses to accommodate terminal apparatuses, respectively;
    a communication apparatus connected to an IP (Internet protocol) network; and
    digital subscriber lines to connect said plurality of terminal accommodation apparatuses and said communication apparatus;
    wherein
    each of said terminal accommodation apparatuses includes a PCM (pulse code modulation) modulator and demodulator to convert a first voice signal from said respective terminal apparatus to a first PCM data and convert a second PCM data from said communication apparatus to a second voice signal, and transmits said first PCM data to said communication apparatus using a signal having a first time division frame structure via said digital subscriber line; and
    said communication apparatus includes a plurality of IP conversion units, each of said IP conversion unit includes a VoIP processing unit to convert said first PCM data received from a respective said terminal accommodation apparatus to a first IP packet and convert a second IP packet received from said IP network to said second PCM data, and transmits said second PCM data to said respective terminal accommodation apparatus using a signal having a second time division frame structure via said digital subscriber line.

2. The communication system according to claim 1, wherein the number of said VoIP processing units which said communication apparatus includes is smaller than the number of said terminal accommodation apparatuses.

3. The communication system according to claim 2, wherein said communication apparatus further includes:
    a subscriber line interface with which said digital subscriber line is connected; and a circuit switch connected to said subscriber line interface and said IP conversion unit to selectively form a communication path between said subscriber line interface and said IP conversion unit.

4. A communication apparatus comprising:
a first interface configured to connect with a terminal accommodation apparatus for accommodating a terminal apparatus via a digital subscriber line;
a second interface configured to connect with an IP network; and
an IP converter including a VoIP processing unit to convert first PCM data received from said terminal accommodation apparatus to first IP packet data and convert second IP packet data received from said IP network to second PCM data;
wherein said first interface receives said first PCM data from said terminal accommodation apparatus using a signal having a first time division frame structure and transmits said second PCM data to said terminal accommodation apparatus using a signal having a second time division frame structure via said digital subscriber line.

5. A terminal accommodation apparatus used in a communication system including a terminal accommodation apparatus to accommodate a telephone terminal and a communication terminal, a communication apparatus including a VoIP processing unit to convert PCM data to IP packet and connected to an IP network, and a digital subscriber line to connect said terminal accommodation apparatus and said communication apparatus, the terminal accommodation apparatus comprising:
a telephone interface to receive a voice signal from said telephone terminal;
a digital interface to receive IP packet data from said communication terminal;
a PCM modulator to convert said received voice signal to PCM data;
a multiple unit configured to insert said PCM data and said IP packet data into respective predetermined time slots of a signal using a time division frame structure; and
a subscriber line interface configured to transmit said signal of said time division frame structure to said communication apparatus via said digital subscriber line.

* * * * *